United States Patent
Kasuga et al.

(10) Patent No.: US 6,620,483 B2
(45) Date of Patent: Sep. 16, 2003

(54) MAGNETIC RECORDING MEDIUM

(75) Inventors: Akira Kasuga, Odawara (JP); Minoru Sueki, Odawara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/103,885

(22) Filed: Mar. 25, 2002

(65) Prior Publication Data

US 2003/0054204 A1 Mar. 20, 2003

(30) Foreign Application Priority Data

Mar. 26, 2001 (JP) ........................................ 2001-088610

(51) Int. Cl.$^7$ .............................................. G11B 5/716
(52) U.S. Cl. ........................ 428/98; 428/141; 428/216; 428/694 BM; 360/134
(58) Field of Search ................... 428/216, 98, 694 BM, 428/141; 360/134

(56) References Cited

U.S. PATENT DOCUMENTS

| | | | | |
|---|---|---|---|---|
| 5,176,965 A | * | 1/1993 | Mallary | ............... 428/694 BM |
| 5,496,607 A | * | 3/1996 | Inaba et al. | ................. 428/65.3 |
| 5,518,804 A | * | 5/1996 | Mizuno et al. | ............. 428/212 |
| 5,993,948 A | * | 11/1999 | Yamazaki et al. | .......... 428/212 |
| 6,319,595 B1 | * | 11/2001 | Katashima et al. | ......... 428/212 |

* cited by examiner

Primary Examiner—Stevan A. Resan
(74) Attorney, Agent, or Firm—Sughrue Mion, PLLC

(57) ABSTRACT

Provided is a magnetic recording medium suited to magnetic recording and reproduction systems employing linear methods and incorporating magnetoresistive reproduction heads. The magnetic recording medium comprising a magnetic layer for servo signal recording, a nonmagnetic layer, and a magnetic layer for information recording in this order on a nonmagnetic support, wherein said magnetic layer for information recording exhibits a coercivity of at least 7.96 kA/m (100 Oe) higher than a coercivity of said magnetic layer for servo signal recording and an interface roughness at the interface of said magnetic layer for servo signal recording and said nonmagnetic layer ranges from 7 to 12 nm.

16 Claims, No Drawings

MAGNETIC RECORDING MEDIUM

TECHNICAL FIELD OF THE INVENTION

The present invention relates to magnetic recording media advantageously employed in the recording of computer data. More specifically, the present invention relates to a magnetic recording medium advantageously employed in magnetic recording and reproduction systems employing magnetoresistive reproduction heads (MR heads).

BACKGROUND OF THE INVENTION

Systems incorporating thin-film magnetic heads have been developed in recent years in magnetic recording and reproduction systems for the recording and reproduction of computer data. Since thin-film magnetic heads are small and readily processed into multitrack heads, multitrack fixed heads in the form of thin-film magnetic heads are widely used, particularly in systems employing magnetic tapes as the recording medium.

Thin-film magnetic heads afford improved recording efficiency and increased track density due to their small size, permitting both high-density recording and improved data transmission rates through the use of multitracks.

Thin-film magnetic heads can be roughly divided into the categories of inductive heads, which respond to changes in magnetic flux over time, and magnetoresistive heads (MR heads), which exploit magnetoresistive effects in responding to changes in magnetic flux magnitude. Due to their flat structure, inductive heads have a low number of head coil windings and do not permit the use of large magnetomotive forces. Accordingly, they have a drawback in that adequate reproduction output cannot be achieved. Thus, MR heads, which readily yield high reproduction outputs, are employed in reproduction, while inductive heads are used for recording.

These recording and reproduction heads are normally built into systems in integrated (combined) form. Linear recording systems affording comparatively rapid data transmission are employed in such magnetic recording systems.

The magnetic tape for computer data recording employed in magnetic recording and reproduction systems into which MR heads are incorporated is determined for each system. For example, known are magnetic tapes corresponding to Models 3480, 3490, and 3570 based on IBM specifications.

These magnetic tapes are of a basic configuration in which a single-layer-structure magnetic layer of a comparatively substantial thickness of about 2.0 to 3.0 $\mu$m comprising ferromagnetic powder and binder is provided on a support. Normally, in such data recording magnetic tapes, a backcoat layer is provided on the back surface on the opposite side from the magnetic layer to prevent winding irregularity and ensure good running durability.

However, such magnetic recording tapes of single-layer structure are problematic in that they are unable to adequately respond to the demands recently placed on them as a storage medium for large quantities of data. In response to such problems, a magnetic recording tape employed in magnetic recording systems incorporating thin-film magnetic heads has been disclosed (Japanese Unexamined Patent Publication (KOKAI) Heisei No. 8-227517), for example. This medium is a magnetic recording medium (magnetic recording tape) in which a lower nonmagnetic layer comprising an inorganic nonmagnetic powder dispersed in binder is provided on a nonmagnetic support and a thin upper magnetic layer in which a ferromagnetic metal powder is dispersed in binder is provided over the nonmagnetic layer.

By employing a thin magnetic layer as the upper layer in this magnetic recording tape, drop in output due to thickness loss is prevented. Further, since high recording densities can be achieved, a higher data storage capacity can be achieved than in the above-described magnetic recording tapes having a single-layer-structure magnetic layer. Specifically, an embodiment is described in the form of a magnetic recording tape for recording computer data in which, on one side of a polyethylene terephthalate support 10 $\mu$m in thickness, a nonmagnetic layer 2.7 $\mu$m in thickness and a magnetic layer 0.3 $\mu$m in thickness are sequentially provided.

To achieve high-recording densities and high capacity, the tracks in magnetic recording systems for data storage are becoming progressively narrower. In the case of magnetic tapes, in longitudinal (linear) recording systems, recording and reproduction heads are driven in the width direction and a track must be selected. That is, during recording and reproduction, the magnetic head must be moved in the width direction (vertical direction) of the magnetic recording tape to select any tracks. However, the narrower the track width, the greater the precision required to control the relative positions of the magnetic recording tape and head.

In conventional methods, the running position of the tape is fixed with a guide or the like and the head moves up and down in a predetermined position. However, if the track width becomes narrow, when the tape expands and contracts within the system, or when the run position of the tape is displaced from the anticipated position, the reproduction head is displaced from the optimal position on the recorded track and output drops. Accordingly, it is necessary to record a servo signal in advance in the longitudinal direction and determine the position of the head relative to the tape to achieve high recording densities.

Information recording by magnetic recording and servo control signal controls such as a positional signal are both performed in the same magnetic layer in conventional magnetic recording tapes. Further, due to the surface properties of the magnetic recording tape, controls are conducted by recording servo control signals on the same surface as the smooth information recording layer. Thus, the capacity of information that can be recorded is that much lower and it is impossible to adequately respond to recent needs for high density and high capacity. The same performance is not required of the magnetic layer for recording servo signals as the magnetic layer for recording information signals. In some cases, there are different performance requirements than for the magnetic layer for recording information signals.

For example, the medium described in Japanese Unexamined Patent Publication (KOKAI) Heisei No. 4-248120 is a magnetic recording medium employing a servo-type magnetic disk for data recording. To stably maintain the servo signal, this medium has a layered structure in which a first magnetic layer, a nonmagnetic layer, and a second magnetic layer are provided on a nonmagnetic support in this order, the coercivity of the lower magnetic layer recording the servo signal is set to equal to or higher than 159 kA/m (2,000 Oe), and the coercivity of the upper magnetic layer for recording information signals is set to equal to or higher than 95.5 kA/m (1,200 Oe). However, when a magnetic recording medium of such a configuration is employed as a magnetic tape for recording and reproducing in the longitudinal direction in a linear recording system, satisfactory results are not necessarily achieved. That is, because of the high coercivity of the lower magnetic layer, there is a problem in that a substantial load is placed on the head, precluding accurate reading of the servo signal and substantially increasing output variation and the like, thus rendering servo signal control difficult.

However, since high recording density and high recording capacity are required as set forth above, there is a need to impart a higher Hc to the magnetic layer that is used to record information signals. Additionally, high recording density is not required of the magnetic layer for the recording of the servo signals to the same degree that it is required in recording information.

Accordingly, Japanese Unexamined Patent Publication (KOKAI) No. 2000-315312 discloses a magnetic tape configured with magnetic layers on both sides, one of the magnetic layers of which is an information recording magnetic layer used exclusively to record information signals and the other magnetic layer of which is a servo signal recording magnetic layer used exclusively to record servo control signals, the Hc of the magnetic layer for recording servo signals being set equal to or less than the Hc of the magnetic layer used to record information. However, this magnetic tape still has a high error generation rate, has practical problems, and requires further improvement.

SUMMARY OF THE INVENTION

Accordingly, the object of the present invention is to provide a magnetic recording medium suited to magnetic recording and reproduction systems employing linear recording and incorporating magnetoresistive reproduction heads. In other words, the object of the present invention is to provide a magnetic recording medium in which track shift (off-track) during running and head clogging are reduced despite narrow track widths to improve resolution and yield a high output, and recording and reproduction are conducted with high reliability.

The present inventors conducted extensive research into achieving a high recording density and a high recording capacity. As a result, they discovered that in a magnetic recording medium configured with a magnetic layer comprising multiple layers, by employing dedicated layers by making the second magnetic layer (upper layer) a magnetic layer for information recording exclusively for recording information and making the first magnetic layer (lower layer) a magnetic layer for servo signal recording exclusively for the recording and controlling of servo control signals; by making the coercivity of the magnetic layer for information recording at least 7.96 kA/m (100 Oe) higher than the coercivity of the magnetic layer for servo signal recording; and by making the interface roughness at the interface between the magnetic layer for servo signal recording and the nonmagnetic layer fall within the range of 7 to 12 nm, the above-stated object of the present invention was achieved.

That is, the above-stated object of the present invention is achieved in a magnetic recording medium comprising a magnetic layer for servo signal recording, a nonmagnetic layer, and a magnetic layer for information recording in this order on a nonmagnetic support, wherein said magnetic layer for information recording exhibits a coercivity of at least 7.96 kA/m (100 Oe) higher than a coercivity of said magnetic layer for servo signal recording and an interface roughness at the interface of said magnetic layer for servo signal recording and said nonmagnetic layer ranges from 7 to 12 nm.

The following are preferred modes of the magnetic recording medium of the present invention.
(1) The magnetic recording medium is a magnetic recording tape.
(2) The magnetic layer for information recording has a thickness of 0.05 to 2.0 μm, the nonmagnetic layer has a thickness of 0.1 to 3.0 μm and the magnetic layer for servo signal recording has a thickness of 0.5 to 3.0 μm.
(3) The magnetic layer for information recording comprises a magnetic material selected from ferromagnetic metal powders and alloy powders and the magnetic layer for servo information recording comprises a magnetic material selected from ferromagnetic metal powders and alloy powders as the magnetic material used in the magnetic layer for information recording.
(4) The magnetic recording tape has a width ranging from 3 to 20 mm, preferably from 7 to 19 mm, further preferably from 10 to 13 mm.
(5) The magnetic recording tape has an overall thickness ranging from 2 to 20 μm, preferably from 5.0 to 13.5 μm, further preferably from 7.0 to 12.5 μm.
(6) The nonmagnetic support is made of polyethylene naphthalate, polyamide (aromatic polyamide, aramide), or polyimide.
(7) The magnetic recording tape has servo control signals recorded along the longitudinal direction of the magnetic recording tape for controlling position of recording and reproducing head in the width direction relative to the magnetic recording tape.
(8) The magnetic recording tape is employed in a magnetic recording and reproduction system equipped with a magnetoresistive reproduction head.
(9) The magnetic recording tape is employed in computer data recording.

DETAILED EXPLANATION OF THE INVENTION

The magnetic recording medium of the present invention is described in greater detail below.

[The Magnetic Layer for Information Recording and the Magnetic Layer for Servo Signal Recording]

The magnetic layer for information recording (also referred to below as the "information layer") and the magnetic layer for servo signal recording (also referred to below as the "servo layer") may both be magnetic layers comprising ferromagnetic powder and binder. The magnetic layer for information recording is dedicated to information recording and the magnetic layer for servo signal recording is dedicated to servo signal recording.

Further, the coercivity (Hc) of the magnetic layer for information recording is adjusted to be at least 7.96 kA/m (100 Oe) higher than the Hc of the magnetic layer for servo signal recording. In linear recording systems conducting recording and reproduction in the longitudinal direction, when the Hc of the magnetic layer for information recording is lower than the Hc of the magnetic layer for servo signal recording, or when the Hc of the magnetic layer for information recording is higher than the Hc of the magnetic layer for servo signal recording but the difference between the two is less than 7.96 kA/m (100 Oe), the data recorded on the information recording layer situated above tends to be erased in the course of recording a servo control signal on the magnetic layer for servo signal recording, therefore, the problem tends to occur that the information recording layer cannot play a role of data recording. Further, in that case, the current flowing to the head increases, creating the risk of heat generation and rendering long-term use problematic. To avoid increasing the load on the head in this manner, rendering the head unable to provide data by faithfully reading the servo signal, causing variation in output, and other undesirable phenomena, the Hc of the information recording layer is set at least 7.96 kA/m (100 Oe) higher than the Hc of the servo recording layer in the magnetic recording tape of the present invention. The Hc of the information recording layer is preferably set at least 7.96 kA/m higher, more preferably at least 39.8 kA/m (500 Oe) higher, than the Hc of the servo signal recording layer.

Currently, a magnetic layer having an Hc conforming to the use requirements of the medium can be manufactured. For example, Co can be added during the manufacture of the magnetic material to adjust the Hc of the magnetic material. That is, increasing the quantity of Co added can increase the Hc of the magnetic material. Accordingly, employing a magnetic material of high Hc and high σs in which the Hc is increased by adjusting the amount of Co added to achieve high density data makes it possible to achieve a magnetic layer of desired Hc in the magnetic layer for information recording of the magnetic recording medium of the present invention. Further, since a density qualitatively as high as that of the magnetic layer for information recording is not required of the magnetic layer for servo signal recording, a magnetic material having a low Hc conforming to the magnetic layer for information recording is selected to adjust the Hc of magnetic layer for servo signal recording.

The possibility of high recording density and high recording capacity are required of the magnetic layer for information recording. Thus, the higher the Hc the better; for example, a level of 79.6 A/m (1,000 Oe) or above is desirable, with a range of 119.4 kA/m (1,500 Oe) to 238.8 kA/m (3,000 Oe) being preferred. By contrast, a high recording density and a high recording capacity are not necessarily required of the magnetic layer for servo signal recording. Thus, the Hc of the magnetic layer for servo signal recording is desirably, for example, equal to or less than 199 kA/m (2,500 Oe), preferably falling within the range of 39.8 kA/m (500 Oe) to 159.2 kA/m (2,000 Oe).

However, when the Hc of the magnetic layer for information recording is high and a magnetic recording tape, for example, is wound into a cartridge, the two magnetic layers magnetically interact, creating a problem in the form of magnetic transfer. That is, the magnetism of the magnetic layer for information recording magnetizes the magnetic layer for servo signal recording positioned in the lower layer, the output of the signals recorded on both magnetic layers decreases, adequate reproduction output cannot be achieved, and accurate servo control is sometimes precluded. Accordingly, in the magnetic recording medium of the present invention, this problem is avoided by controlling the surface properties at the interface between the magnetic layer for servo signal recording and the nonmagnetic layer to a prescribed state. That is, in the magnetic recording medium of the present invention, the interface roughness at the interface between the magnetic layer for servo signal recording and the nonmagnetic layer is made to fall within a range of 7 to 12 nm. By remaining within this range, a suitable gap is maintained between the magnetic layer for servo signal recording and the magnetic layer for information recording; preventing magnetic transfer. When the interface roughness at the interface of the magnetic layer for servo signal recording and the nonmagnetic layer is made less than 7 nm, there is a risk that magnetic transfer will occur, and when it exceeds 12 nm, the surface properties of the magnetic layer for servo signal recording affect the surface properties of the magnetic layer for information recording, decreasing reproduction output. The interface roughness at the interface of the magnetic layer for servo signal recording and the nonmagnetic layer preferably falls within the range of 8 to 11 nm.

The magnetic recording medium of the present invention has a three-layered structure. In the manufacturing process, portions sometimes remain on the surface of the magnetic layer for servo signal recording on which neither the nonmagnetic layer nor the magnetic layer for information recording is coated. In such cases, the surface roughness of such portions can be measured to determine the interface roughness at the interface of the magnetic layer for servo signal recording and the nonmagnetic layer.

Further, the surface roughness at the interface of the magnetic layer for servo signal recording and the nonmagnetic layer may also be determined by the following method. First, a small piece is cut out in the longitudinal direction of the magnetic recording medium and sliced into ultrathin strips about 0.08 μm in thickness with a diamond knife (Model Ultramicrotom KB-V). A transmission electron microscope (Model H900 from Hitachi, Ltd.) is then used to take five electron microscope photographs at a magnification of 10,000 times of the ultrathin strips obtained. These photographs are enlarged 50,000-fold, placed on a transparent base, and visually observed to trace the interface of the magnetic layer for servo signal recording and the nonmagnetic layer with a fine magic marker. The length of the trace is 28 cm on a 5,000-fold magnification photograph (converting to an actual recording medium size of 5.6 μm). Once the five photographs have been traced by this method, an image analyzer (a KS-400 from Carl Zeiss) can be used to measure the interface roughness at the interface of the magnetic layer for servo signal recording and the nonmagnetic layer.

As a method of keeping the interface roughness at the interface between the magnetic layer for servo signal recording and the nonmagnetic layer within the above-stated range, the desired interface roughness can be achieved by constantly keeping the viscosity within a certain range in the process of manufacturing a coating liquid for the magnetic layer for servo signal recording. Further, the following are further methods of controlling the surface properties of the magnetic layer for servo control signal recording that are suitable for use: (1) employing a smooth nonmagnetic support; (2) during the step of kneading the magnetic material and binder, adding a solvent in small increments and applying a suitable shear to prevent the production of lumps while kneading; (3) adding dispersants during the kneading step to achieve uniform dispersion; (4) slowly adding a diluted solvent so as not to produce lumps while restoring a slurry state following kneading; (5) uniformly dispersing a minute dispersion media corresponding in particle size to the magnetic material; (6) applying the coating immediately following preparation of the coating liquid, before the magnetic material particles have time to aggregate; and (7) during coating and drying of the magnetic layer, selecting optimal conditions of drying temperature and coating rate to prevent surface roughness due to sudden drying.

The magnetic layer dedicated to recording servo control signals may contain the same ferromagnetic powder as the information recording magnetic layer, or a completely different ferromagnetic powder. Examples of ferromagnetic powders are $\gamma$-$Fe_2O_3$, $Fe_3O_4$, $FeOx$ (x=1.33–1.5), $CrO_2$, Co-comprising $\gamma$-$Fe_2O_3$, Co-comprising $FeOx$ (x=1.33–1.5), ferromagnetic alloy powders (ferromagnetic metal powder) having a principal component (comprising equal to or higher than 75 percent) in the form of Fe, Ni, or Co, and hexagonal ferrite powder.

From the perspective of achieving a high Hc, examples of ferromagnetic powders employed in the magnetic layer for information recording are $\gamma$-$Fe_2O_3$, $Fe_3O_4$, FeOx (x=1.33–1.5), $CrO_2$, Co-comprising $\gamma$-$Fe_2O_3$, Co-comprising FeOx (x=1.33–1.5), and ferromagnetic alloy powders (ferromagnetic metal powder) having a principal component (comprising equal to or higher than 75 percent) in the form of Fe, Ni, or Co.

In addition to prescribed atoms, the following atoms can be contained in the ferromagnetic powder: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B and the like. These ferromagnetic powders may be pretreated prior to dispersion with dispersing agents, lubricants, surfactants, antistatic agents and the like as described below.

The ferromagnetic alloy powder among the above-mentioned ferromagnetic powders may contain a small quantity of hydroxide or oxide. Ferromagnetic alloy powders obtained by known manufacturing methods may be employed. The following are examples: methods of reduction with compound organic acid salts (chiefly oxalates) and reducing gases such as hydrogen; methods of reducing iron oxide with a reducing gas such as hydrogen to obtain Fe or Fe—Co particles or the like; methods of thermal decomposition of metal carbonyl compounds; methods of reduction by addition of a reducing agent such as sodium boron hydride, hypophosphite, or hydrazine to an aqueous solution of ferromagnetic metal; and methods of obtaining micropowder by vaporizing a metal in a low-pressure non-reactive gas. The ferromagnetic alloy powders obtained in this manner may be subjected to any of the known slow oxidation treatments, such as immersion in an organic solvent followed by drying; the method of immersion in an organic solvent followed by formation of an oxide film on the surface by feeding in an oxygen-containing gas, then drying; and the method of forming an oxide film on the surface by adjusting the partial pressure of oxygen gas and a inert gas without using an organic solvent.

The above-described ferromagnetic powder suitably has a specific surface area by BET of 25 to 80 $m^2$/g, preferably 40 to 70 $m^2$/g. A level equal to or higher than 25 $m^2$/g reduces noise, and a level equal to or less than 80 $m^2$/g yields good surface properties. The crystallite size of the ferromagnetic powder particles is 450 to 100 Angstroms, preferably 350 to 100 Angstroms. The $\sigma s$ of iron oxide magnetic powder is equal to or higher than 50 $A \cdot m^2$/kg (emu/g), preferably equal to or higher than 70 $A \cdot m^2$/kg (emu/g). For ferromagnetic metal powder, this value is preferably equal to or higher than 100 $A \cdot m^2$/kg (emu/g), more preferably equal to or higher than 110 to 170 $A \cdot m^2$/kg (emu/g).

The r3000 of the ferromagnetic powder is desirably equal to or less than 1.5. Preferably, the r3000 is equal to or less than 1.0. The r3000 value denotes the percentage of the level of magnetization remaining without reversal when a magnetic field of 239 kA/m (3,000 Oe) is applied in a reverse direction following saturation magnetization of the magnetic recording tape. The moisture content of the ferromagnetic powder is desirably 0.01 to 2 weight percent. The moisture content of the ferromagnetic powder is desirably optimized based on the type of binder employed. The tap density of the $\gamma$-iron oxide is desirably equal to or higher than 0.5 g/mL, preferably equal to or higher than 0.8 g/mL. For alloy powder, it is desirably 0.2 to 0.8 g/mL. At equal to or less than 0.8 g/mL, oxidation tends not to progress even during the step of consolidating the ferromagnetic powder, and an adequate $\sigma s$ value can be obtained. When the tap density is equal to or higher than 0.2 g/mL, dispersion tends to be adequate.

When employing $\gamma$-iron oxide, the ratio of divalent iron to trivalent iron desirably ranges from 0 to 20 percent, preferably 5 to 10 percent. The quantity of cobalt atoms relative to iron atoms ranges from 0 to 15 percent, preferably from 2 to 8 percent. The pH of the ferromagnetic powder is desirably optimized based on the combination with binder. The range thereof ranges from 4 to 12, preferably from 6 to 10. The surface of the ferromagnetic powder particles may be at least partially coated with an oxide of Al, Si, Y, Nd, or the like, as needed. The quantity thereof ranges from 0.1 to 10 percent of the ferromagnetic powder, and surface treatment is preferable because of permitting the adsorption of lubricant such as a fatty acid equal to or less than 100 mg/$m^2$. The ferromagnetic powder sometimes comprises inorganic ions such as soluble Na, Ca, Fe, Ni, and Sr. So long as the content thereof does not exceed 500 ppm, characteristics are not particularly affected.

There are desirably few holes in the above-described ferromagnetic powder, and the value thereof is desirably equal to or less than 20 volume percent, preferably equal to or less than 5 volume percent. The shape thereof may be any of acicular, granular, rice-particle, or plate-shaped, so long as the particle size characteristics set forth above are satisfied. When the ferromagnetic powder is suitably acicular in shape, the acicular ratio is equal to or less than 18, preferably equal to or less than 12.

To keep the switching field distribution (SFD) of the ferromagnetic powder at or below 0.6, the Hc distribution of the ferromagnetic powder must be kept narrow. Methods of achieving this include improving the particle size distribution of goethite, preventing sintering of $\gamma$-hematite, and slowing the rate of coating of cobalt in cobalt-modified iron oxide relative to the conventional rate.

Plate-shaped hexagonal ferrite in the form of various substitution products of barium ferrite, strontium ferrite, lead ferrite, and calcium ferrite; Co substitution products; and hexagonal Co powder may be employed as ferromagnetic powder. Specific examples are magnetoplumbite-type barium ferrite and strontium ferrite; and magnetoplumbite-type barium ferrite, strontium ferrite, and the like partially comprising a spinel phase. Co substitution products of barium ferrite and strontium ferrite are particularly preferred. In addition to other prescribed atoms, elements such as Al, Si, S, Sc, Ti, V, Cr, Cu, Y, Mo, Ag, Tc, P, Au, Ba, Ta, and Ce may also be incorporated. To control coercivity, products obtained by adding elements such as Co—Ti, Co—Ti—Zr, Co—Ti—Zn, Ni—Ti—Zn, and Ir—Zn to the above-described hexagonal ferrite may also be employed. Hexagonal ferrite is usually in the form of hexagonal plate-shaped particles. The particle size thereof means the width of the plate of the hexagonal plate-shaped particle, and it is measured by electron microscopy.

The particle size of the above-described ferrite suitably falls within a range of 0.01 to 0.2 $\mu$m, preferably 0.03 to 0.1 $\mu$m. Further, the mean (plate) thickness of the particles ranges from about 0.001 to 0.2 $\mu$m, with 0.003 to 0.05 $\mu$m being particularly preferred. The plate-shaped ratio (particle size/plate thickness) ranges from 1 to 10, preferably from 3 to 7. Further, the specific surface area ($S_{BET}$) of the hexagonal ferrite powder as measured by BET desirably ranges from 25 to 70 $m^2$/g.

Conventionally known thermoplastic resins, thermosetting resins, reactive resins, and mixtures thereof are examples of binders employed in the magnetic layer for information recording and magnetic layer for servo signal recording of the present invention. These binders may be identical to or different from the binder employed in the nonmagnetic layer.

The above-mentioned thermoplastic resin has a glass transition temperature of −100 to 150° C., a number average molecular weight of 1,000 to 200,000, preferably 10,000 to 100,000, and a degree of polymerization of about 50 to 1000. Examples of such thermoplastic resins are polymers or copolymers comprising structural units in the form of vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal, and vinyl ether; polyurethane resins, and various rubber-based resins. Examples of thermosetting and reactive resins are phenol resins, epoxy resins, polyurethane-curing resins, urea resins, melamine resins, alkyd resins, acrylic reactive resins, formaldehyde resins, silicone resins, epoxy-polyamide resins, mixtures of polyester resins and isocyanate prepolymers, mixtures of polyester polyols and polyisocyanates, and mixtures of polyurethanes and polyisocyanates.

These resins are described in detail in the *Handbook of Plastics* published by Asakura Shoten. It is also possible to employ known electron beam-cured resins in magnetic and nonmagnetic layers. Examples thereof and methods of manufacturing It the same are described in Japanese Unexamined Patent Publication (KOKAI) Showa No. 62-256219. The above-listed resins may be used singly or in combination. Preferred resins are combinations of polyurethane resin and at least one member selected from the group consisting of vinyl chloride resin; vinyl chloride—vinyl acetate resin; vinyl chloride—vinyl acetate—vinyl alcohol resin; and vinyl chloride—vinyl acetate—maleic anhydride copolymers; or combinations of the same with polyisocyanate.

Known structures of polyurethane resin can be employed, such as polyester polyurethane, polyether polyurethane, polyether polyester polyurethane, polycarbonate polyurethane, polyester polycarbonate polyurethane, and polycaprolactone polyurethane. To obtain as needed better dispersibility and durability, it is desirable to use those introduced by copolymerization or addition reaction one or more polar groups selected from among —COOM, —SO$_3$M, —OSO$_3$M, —P=O(OM)$_2$, —O—P=O(OM)$_2$, (where M denotes a hydrogen atom or an alkali metal base), —OH, —NR$_2$, —N$^+$R$_3$, (where R denotes a hydrocarbon group), epoxy groups, —SH, —CN and the like. The quantity of the polar group is from $10^{-1}$ to $10^{-8}$ mol/g, preferably from $10^{-2}$ to $10^{-6}$ mol/g.

Specific examples of the binders employed in the present invention are VAGH, VYHH, VMCH, VAGF, VAGD, VROH, VYES, VYNC, VMCC, XYHL, XYSG, PKHH, PKHJ, PKHC, and PKFE from Union Carbide Corporation.; MPR-TA, MPR-TA5, MPR-TAL, MPR-TSN, MPR-TMF, MPR-TS, MPR-TM, and MPR-TAO from Nisshin Kagaku Kogyo K.K.; 1000W, DX80, DX81, DX82, DX83, and 100FD from Denki Kagaku Kogyo K.K.; MR-105, MR110, MR100, and 400X-110A from Nippon Zeon Co., Ltd.; Nippollan N2301, N2302, and N2304 from Nippon Polyurethane Industry Co., Ltd.; Pandex T-5105, T-R3080, T-5201, Burnock D-400, D-210-80, Crisvon 6109, and 7209 from Dainippon Ink And Chemicals, Incorporated.; Vylon UR8200, UR8300, UR8700, UR4300, RV530, and RV280 from Toyobo Co.,Ltd.; Dipheramin 4020, 5020, 5100, 5300, 9020, 9022, and 7020 from DainichiSeika Colar & Chemicals Mfg. Co.,Ltd.; MX5004 from Mitsubishi Chemical Corp.; Sunprene SP-150, TIM-3003 and TIM-3005 from Sanyo Chemical Industries, Ltd.; and Salan F310 and F210 from Asahi Chemical Industry Co., Ltd.

The binders used in the magnetic layer are employed in a range of 5 to 50 weight percent, preferably 10 to 30 weight percent, of the ferromagnetic powder. When vinyl chloride-based resin is employed, the range is 5 to 30 weight percent, when polyurethane resin is employed, 2 to 20 weight percent, and when polyisocyanate is employed, 2 to 20 weight percent; these are desirably combined for use. When polyurethane is employed in the present invention, the glass transition temperature desirably ranges from −50 to 100° C., the elongation at break from 100 to 2,000 percent, the stress at break from 4.9 to 980 kPa (0.05 to 10 kg/cm$^2$), and the yield point from 4.9 to 980 kPa (0.05 to 10 kg/cm$^2$).

The magnetic recording medium of the present invention comprises at least a magnetic layer for information recording, a nonmagnetic layer thereunder, and a magnetic layer for servo signal recording provided on the other surface of the support. Accordingly, the quantity of binder in each layer; the proportion of vinyl chloride resin, polyurethane resin, polyisocyanate, or some other resin in the binder; the molecular weight of each of the resins forming the magnetic layers; the quantity of polar groups; and the above-described physical characteristics of the resins may be suitably varied as needed between the nonmagnetic layer, magnetic layer for information recording, and magnetic layer for servo signal recording. For example, increasing the quantity of binder in the magnetic layers effectively decreases scratching of the surface of the magnetic layer, and increasing the quantity of binder in the nonmagnetic layer imparts flexibility to achieve good head touch.

Examples of polyisocyanates employed as a binder in the present invention are tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co. Ltd.; and Desmodule L, Desmodule IL, Desmodule N and Desmodule HL manufactured by Sumitomo Bayer Co. Ltd. They can be used singly or in combinations of two or more in both the nonmagnetic layer and the magnetic layer by exploiting differences in curing reactivity.

Carbon black can be added to both the magnetic layer for information recording and magnetic layer for servo signal recording. In addition, carbon black is also added to the nonmagnetic layer as needed.

Examples of carbon black suitable for use are furnace black for rubber, thermal for rubber, black for coloring, and acetylene black. It is preferable that a specific surface area of carbon black ranges from 5 to 500 m$^2$/g, a DBP oil absorption capacity ranges from 10 to 400 ml/100 g, a particle diameter ranges from 5 to 300 nm, a pH ranges from 2 to 10, a moisture content ranges from 0.1 to 10 weight percent, and a tap density ranges from 0.1 to 1 g/ml. Specific examples of types of carbon black employed in the present invention are: BLACK PEARLS 2000, 1300, 1000, 900, 800, 700 and VULCAN XC-72 manufactured by Cabot Corporation; #80, #60, #55, #50 and #35 manufactured by Asahi Carbon Co. Ltd.; #2400B, #2300, #900, #1000, #30, #40 and #10B manufactured by Mitsubishi Chemical Corporation; and CONDUCTEX SC, RAVEN 150, 50, 40 and 15 manufactured by Columbia Carbon Co. Ltd. The carbon black employed may be surface-treated with a dispersant or the like, or grafted with resin, or have a partially graphite-treated surface. The carbon black may be dispersed in advance into the binder prior to addition to the magnetic coating material. These carbon blacks may be used singly or in combination.

When employing carbon black, the quantity preferably ranges from 0.1 to 30 weight percent with respect to the ferromagnetic powder.

Carbon black works to prevent static buildup, reduce the coefficient of friction, impart light-blocking properties, enhance film strength, and the like in the magnetic layer; the properties vary with the type of carbon black. Accordingly, it is, as a matter of course, possible for carbon black used in the present invention to properly use varying the kinds, quantity and combination between the magnetic layer for information recording, the magnetic layer for servo signal recording and the nonmagnetic layer according to the purpose on the basis of the above-mentioned characteristics, such as particle size, oil absorption capacity, electrical conductivity, and pH.

For example, the *Carbon Black Handbook* compiled by the Carbon Black Association may be consulted for types of carbon black suitable for use in the present invention.

Abrasives can be added to both the magnetic layer for information recording and the magnetic layer for servo signal recording. In addition, abrasives can be added to the nonmagnetic layer as needed.

Known materials with a Mohs' hardness equal to or higher than 6, principally in the form of α-alumina with an α conversion rate equal to or higher than 90 percent, β-alumina, silicon carbide, chromium oxide, cerium oxide, α-iron oxide, corundum, artificial diamond, silicon nitride, titanium carbide, titanium oxide, silicon dioxide, and boron nitride, can be employed singly or in combination as abrasives in the present invention. Further, complexes of these abrasives (one abrasive that has been surface treated with another abrasive) may also be employed. There are cases where compounds or elements other than the principal components are contained in these abrasives; the effect does not change so long as the principal components account for equal to or higher than 90 weight percent. Abrasives with a particle size of 0.01 to 2 $\mu$m are preferred. Further, as needed, the same effect may be imparted by combining abrasives of differing particle sizes or widening the particle size distribution of a single abrasive. A tap density of 0.3 to 2 g/mL, a moisture content of 0.1 to 5 weight percent, a pH of 2 to 11, and a specific surface area of 1 to 30 m$^2$/g are preferred. The abrasive may be acicular, spherical, or cubic in shape, but a partially angular shape is preferred for its good abrasive properties. Specific examples of abrasives are AKP-20, AKP-30, AKP-50, HIT-55, HIT-60A, HIT-70 and HIT-100 from Sumitomo Chemical Co., Ltd.; G5, G7, and S1 from Nippon Chemical Industrial Co., Ltd.; and TF-100 and TF-140 from Toda Kogyo Corp. Different types, quantities, and combinations of abrasive may be employed in the magnetic layer (magnetic layer for information recording and magnetic layer for servo signal recording) and nonmagnetic layer based on the objective. These abrasives may be first dispersed in binder and then added to the magnetic coating liquid. The number of abrasive particles present on the magnetic layer surface and magnetic layer side surfaces of the magnetic recording tape of the present invention is desirably equal to or higher than 5/100 $\mu$m$^2$.

Substances having lubricating effects, antistatic effects, dispersion effects, plasticizing effects, or the like may be further employed other than the above-mentioned additives in the magnetic layer for information recording and magnetic layer for servo signal recording of the present invention. In addition, these additives may be employed in the nonmagnetic layer as needed.

Examples of such additives used are: molybdenum disulfide; tungsten graphite disulfide; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; fluorine-containing alkylsulfuric esters and their alkali metal salts; monobasic fatty acids having 10 to 24 carbon atoms (which may contain an unsaturated bond or may be branched) and metal (e.g., Li, Na, K, Cu) salts thereof; monohydric, dihydric, trihydric, tetrahydric, pentahydric and hexahydric alcohols having 12 to 22 carbon atoms (which may contain an unsaturated bond or be branched); alkoxy alcohols having 12 to 22 carbon atoms; monofatty esters, difatty esters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); fatty esters of monoalkyl ethers of alkylene oxide polymers; fatty acid amides having 8 to 22 carbon atoms; and aliphatic amines having 8 to 22 carbon atoms.

Specific examples of compounds are: lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol. It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, or sulfoniums; anionic surfactants comprising acid groups such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines.

Details of these surfactants are described in "Surfactants Handbook" (published by Sangyo Tosho Co., Ltd.). These lubricants, antistatic agents and the like need not be 100 percent pure and may contain impurities, such as isomers, unreacted materials, by-products, decomposition products and oxides in addition to the main components. These impurities are preferably comprised equal to or less than 30 weight percent, and more preferably equal to or less than 10 percent.

The above-mentioned lubricants and surfactants may be employed differently in the nonmagnetic layer, the magnetic layer for information recording and the magnetic layer for servo signal recording as needed based on type and quantity. For example, it is conceivable (1) to control bleeding onto the surface through the use in the magnetic layer for information recording, magnetic layer for servo signal recording and nonmagnetic layer of fatty acids having different melting points, (2) to control bleeding onto the surface through the use of esters having different boiling points and polarities, (3) to improve coating stability by adjusting the amount of surfactant, and (4) to enhance the lubricating effect by increasing the amount of the lubricant added to the nonmagnetic layer; this is not limited to the examples given here.

All or some of the additives used in the present invention may be added at any stage of the process of manufacturing the magnetic coating material. For example, they may be mixed with the ferromagnetic powder before a kneading step; added during a step of kneading the ferromagnetic powder, the binder, and the solvent; added during a dispersing step; added after dispersing; or added immediately before coating. According to the purpose, part or all of the additives may be applied by simultaneous or sequential coating after the magnetic layer has been applied to achieve a purpose. Depending on the objective, the lubricant may be coated on the surface of the magnetic layer after calendering or making slits.

Examples of the trade names of lubricants suitable for use in the present invention are: NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hydrogenated castor oil fatty acid, NAA-42, NAA-44, Cation SA, Cation MA, Cation AB, Cation BB, Nymeen L-201, Nymeen L-202, Nymeen S-202, Non-ion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, butyl stearate, butyl laurate, and erucic acid manufactured by NOF Corporation.; oleic acid manufactured Kanto Chemical Co. Ltd; FAL-205 and FAL-123 manufactured by Takemoto Oil & Fat Co.,Ltd.; NJLUB LO, NJLUB IPM, and Sansosyzer E4030 manufactured by New Japan Chemical Co. Ltd.; TA-3, KF-96, KF-96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910 and KF-3935 manufactured by Shin-Etsu Chemical Co. Ltd.; Armide P, Armide C and Armoslip CP manufactured by Lion Armour Co.,Ltd.; Duomine TDO manufactured by Lion Corporation; BA-41G manufactured by Nisshin Oil Mills, Ltd.; Profan 2012E, Newpole PE61, Ionet MS-400, Ionet MO-200, Ionet DL-200, Ionet DS-300, Ionet DS-1000 and Ionet DO-200 manufactured by Sanyo Chemical Industries, Ltd.

The organic solvent employed in the present invention may be used in any ratio. Examples are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons, such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane. These organic solvents need not be 100 percent pure and may contain impurities such as isomers, unreacted materials, by-products, decomposition products, oxides and moisture in addition to the main components. The content of these impurities is preferably equal to or less than 30 percent, more preferably equal to or less than 10 percent. Preferably the same type of organic solvent is employed in the present invention for the magnetic layer liquid and nonmagnetic layer liquid. However, the amount added may be varied. The stability of coating is increased by using a solvent with a high surface tension (such as cyclohexanone or dioxane) in the nonmagnetic layer. Specifically, it is important that the arithmetic mean value of the upper layer solvent composition not be less than the arithmetic mean value of the lower layer solvent composition. To improve dispersion properties, a solvent having a somewhat strong polarity is desirable. It is desirable that solvents having a dielectric constant equal to or higher than 15 is comprised equal to or higher than 50 percent of the solvent composition. Further, the dissolution parameter is desirably from 8 to 11.

[The Nonmagnetic Layer]

In the magnetic recording medium of the present invention there is a nonmagnetic layer between the magnetic layer for servo signal recording and the magnetic layer for information recording. Providing a nonmagnetic layer beneath the magnetic layer for information recording permits thinning of the magnetic layer for information recording. Thus, self-demagnetization loss and recording demagnetization loss are reduced and output can be increased in the short wavelength range of the magnetic layer for information recording. Further, providing a nonmagnetic layer yields a low coefficient of friction even if making the magnetic surface for information recording smooth, resulting in good running durability. This is thought to be the result of lubricant being constantly supplied to the surface because of the ample quantity of lubricant in the lower layer despite consumption of lubricant on the surface of the magnetic layer due to sliding.

The nonmagnetic layer comprises a binder and a nonmagnetic powder. The binder and the other additives are as described for the magnetic layer above.

The nonmagnetic powder suitable for use in the nonmagnetic layer of the magnetic recording medium of the present invention may be selected from inorganic compounds such as metal oxides, metal carbonates, metal sulfates, metal nitrides, metal carbides and metal sulfides. Examples of the inorganic compounds are $\alpha$-alumina having an $\alpha$-conversion rate equal to or higher than 90 percent, $\beta$-alumina, $\gamma$-alumina, silicon carbide, chromium oxide, cerium oxide, $\alpha$-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide and the like; these may be used singly or in combination. Particular desirable are titanium dioxide, zinc oxide, iron oxide and barium sulfate. Even more preferred are titanium dioxide and $\alpha$-iron oxide. The particle size of these nonmagnetic powders preferably ranges from 0.005 to 2 $\mu$m, but nonmagnetic powders of differing particle size may be combined as needed, or the particle diameter distribution of a single nonmagnetic powder may be broadened to achieving the same effect. What is preferred most is a particle size in the nonmagnetic powder ranging from 0.01 to 0.2 $\mu$m. The shape may be any of acicular, spindle-shaped, granular or plate-shaped, and the acicular and spindle-shaped are particular preferred.

The tap density ranges from 0.05 to 2 g/ml, preferably from 0.2 to 1.5 g/ml. The moisture content ranges from 0.1 to 5 weight percent, preferably from 0.2 to 3 weight percent. The pH ranges from 2 to 11, and the pH between 6 to 9 is particular preferred.

The specific surface area ranges from 1 to 100 $m^2/g$, preferably from 5 to 80 $m^2/g$, further preferably from 7 to 70 $m^2/g$. The crystalline size preferably ranges from 0.01 to 2 $\mu$m.

The oil absorption capacity utilizing DBP ranges from 5 to 100 ml/100 g, preferably from 10 to 80 ml/100 g, further preferably from 20 to 60 ml/100 g. The specific gravity ranges from 1 to 12, preferably from 3 to 6. The shape may be any of acicular, spherical, polyhedral or plate-shaped. The ignition loss is preferably equal to or less than 20 weight percent. The Mohs' hardness of the aforementioned inorganic powder used in the present invention is preferably equal to or higher than 4. The roughness factor of the surface of these powders preferably ranges from 0.8 to 1.5, further preferably from 0.9 to 1.2. The stearic acid (SA) adsorption amount ranges from 1 to 20 $\mu$mol/m$^2$, further preferably from 2 to 15 $\mu$mol/m$^2$. The heat of wetting in 25° C. water of the nonmagnetic powder is preferably within the range of 20 to 60 $\mu$J/cm (200 to 600 erg/cm$^2$). A solvent with a heat of wetting within this range may also be employed.

The number of water molecules on the surface at 100 to 400° C. appropriately ranges from 1 to 10 molecules per 100 Å. The pH at the isoelectric point in water preferably ranges from 3 to 6.

The surface of these powders is preferably treated with at least one compound selected from $Al_2O_3$, $SiO_2$, $TiO_2$, $ZrO_2$, $SnO_2$, $Sb_2O_3$ and ZnO. The surface-covering agents of preference with regard to dispersibility are at least one compound selected from $Al_2O_3$, $SiO_2$, $TiO_2$, and $ZrO_2$, and at least one compound selected from $Al_2O_3$, $SiO_2$ and $ZrO_2$ are further preferable. Specifically, $Al_2O_3$ and $SiO_2$ are preferably used in combination. In this case, the coating structure which comprises a first alumina coating and a second silica coating thereover or the reverse structure thereof may also be adopted. Further, two compounds may be simultaneously used for coating. The aforementioned surface layer with coating compounds may be a porous layer depending on the objective, with homogeneity and density being generally desirable.

Specific examples of nonmagnetic powders are: UA5600 and UA5605 manufactured by Showa Denko K. K.; AKP-20, AKP-30, AKP-50, HIT-55, HIT-60A, HIT-100 and ZA-G1 manufactured by Sumitomo Chemical Co., Ltd.; G5, G7 and S-1 manufactured by Nippon Chemical Industrial Co., Ltd.; TF-100, TF-120, TF-140 and R516 manufactured by Toda Kogyo Corp.; TTO-51B, TTO-55A, TTO-55B, TTO-55C, TTO-55S, TTO-55D, FT-1000, FT-2000, FTL-100, FTL-200, M-1, S-1, SN-100, R-820, R-830, R-930, R-550, CR-50, CR-80, R-680 and TY-50 manufactured by Ishihara Sangyo Corp.; ECT-52, STT-4D, STT-30D, STT-30 and STT-65C manufactured by Titan Kogyo K. K.; T-1 manufactured by Mitsubishi Materials Corporation; NS-O, NS-3Y and NS-8Y manufactured by Nippon Shokubai Co., Ltd.; MT-100S, MT-100T, MT-150W, MT-500B, MT-600B and MT-100F manufactured by Tayca Corporation; FINEX-25, BF-1, BF-10, BF-20, BL-1L and BL-1OP manufactured by Sakai Chemical Industry Co., Ltd.; DEFIC-Y and DEFIC-R manufactured by Dowa Mining Co., Ltd.; Y-LOP manufactured by Titan Kogyo K. K.; and sintered products of the same.

Since titanium dioxide is a particularly desirable nonmagnetic powder, an example of methods for manufacturing titanium dioxide will be described in detail.

The principal methods of manufacturing titanium dioxide are the sulfuric acid method and the chlorine method. In the sulfuric acid method, crude ilmenite ore is digested with sulfuric acid, and Ti, Fe, and the like are extracted as sulfates. The iron sulfate is separated by crystal deposition and removed, and the remaining titanyl sulfate solution is filtered, refined, and hot hydrolyzed to precipitate the hydrous titanium. This is filtered and refined, and the various impurities that are present are removed by washing. A particle size adjusting agent is added and the product is sintered at 80 to 1,000° C., yielding crude titanium oxide. The rutile and anatase types are separated based on the type of nucleating agent added during hydrolysis. The crude titanium oxide is comminuted, graded, surface treated, and the like. In the chlorine method, natural rutile and synthetic rutile are employed as crude ore. The ore is chlorinated in a state of reduction at high temperature, with the Ti becoming $TiCl_4$ and the Fe becoming $FeCl_2$. The iron oxide that solidifies during cooling is separated from the liquid $TiCl_4$. The crude $TiCl_4$ obtained is purified by rectification, a nucleating agent is added, and the mixture is instantaneously reacted with oxygen at a temperature equal to or higher than 1,000° C. to obtain crude titanium oxide. The finishing method employed to impart pigment properties to the crude titanium oxide produced in this oxygen decomposition step is identical to that employed in the sulfuric acid method. Surface treatment is conducted by dry pulverizing the above-described titanium oxide material, adding water and a dispersing agent, conducting wet pulverization, and employing centrifugal separation to grade the crude particles. Subsequently, the microparticle slurry is moved to a surface treatment vat, where the microparticle surfaces are coated with metallic hydroxide. First, a saline aqueous solution of a prescribed quantity of Al, Si, Ti, Zr, Sb, Sn, Zn, or the like is added, an acid or alkali is added to neutralize the mixture, and the surface of the titanium oxide particles is coated with the hydrous oxide produced. The water-soluble salt by-products are removed by decantation, filtering, and washing, the pH of the slurry is adjusted, and the product is filtered and washed with pure water. The washed cakes are dried in a spray dryer or band dryer. Finally, the dried product is comminuted in a jet mill to obtain the manufactured product. Further, $AlCl_3$ and $SiCl_4$ vapor may be passed through not only an aqueous system, but also oxidized titanium powder, after which steam is introduced to surface coat the Al and/or Si-containing oxide.

$\alpha$-iron oxide is a further example of a preferred nonmagnetic powder suitable for use in the nonmagnetic layer. An $\alpha$-iron oxide is selected that is preferably either acicular or spindle-shaped and has a mean major axis length falling within a range of 0.05 to 0.3 $\mu$m, preferably 0.06 to 0.15 $\mu$m, an acicular ratio of 2 to 20, preferably 3 to 10, and a pH of 7 to 11, preferably 8 to 11, and most preferably, 9 to 10. A known process such as the pH adjustment in the step of neutralizing an alkali such as sodium hydroxide or sodium carbonate employed in the step of preparing $\alpha$-iron oxide, or adjustment of the degree of washing in the washing step in which the alkali is washed away with water or the like, can be conducted to obtain $\alpha$-iron oxide having a pH falling within the stated range. Further, the use of $\alpha$-iron oxide at least a portion of the surface of which has been coated with at least one compound selected from among $Al_2O_3$, $SiO_2$, and $ZrO_2$ is desirable because of a significant improvement in storage properties at high temperature and high humidity. Further, surface treatment with an inorganic compound (for example, the compounds denoted by general formulas (1) and (3) in U.S. Pat. No. 5,318,838) comprising an acid group derived from an oxygen acid of phosphorus such as phenylphosphonic acid substantially improves storage properties at high temperature and high humidity.

Reference can be made to the "Characterization of Powder Surfaces" by Academic Press for other methods of manufacturing pigments.

Mixing carbon black into the nonmagnetic layer achieves the known effects of lowering surface resistivity Rs.

Examples of carbon black suitable for use are furnace black for rubber, thermal for rubber, black for coloring and acetylene black. The specific surface area ranges from 100 to 500 $m^2/g$, preferably from 150 to 400 $m^2/g$, the DBP oil absorption capacity ranges from 20 to 400 ml/100 g, preferably from 30 to 200 ml/100 g. The particle diameter ranges from 5 to 80 nm, preferably from 10 to 50 nm, further preferably from 10 to 40 nm. It is preferable that the pH ranges from 2 to 10, the moisture content ranges from 0.1 to 10 percent, and the tap density ranges from 0.1 to 1 g/ml. Specific examples of carbon black suitable for use in the nonmagnetic layer are: BLACKPERLS 2000, 1300, 1000, 900, 800, 880, 700 and VULCAN XC-72 manufactured by Cabot Corporation; #3050B, 3150B, 3250B, #3750B, #3950B, #950, #650, #970B, #850B and MA600 manufactured by Mitsubishi Chemical Corp.; CONDUCTEX SC, RAVEN 8800, 8000, 7000, 5750, 52650, 3500, 2100, 2000, 1800, 1500, 1255 and 1250 manufactured by Columbia Carbon Co., Ltd; and Ketjen Black EC manufactured by Lion Akzo Co., Ltd.

The carbon black employed can be surface treated with a dispersing agent or the like, grafted with a resin, or a portion of the surface may be graphite-treated. Further, the carbon black may be dispersed with a binder prior to being added to the coating material. These types of carbon black are employed in a range that does not exceed 50 weight percent with respect to the inorganic powder above and does not exceed 40 percent with respect to the total weight of the nonmagnetic layer. These types of carbon black may be employed singly or in combination. The Carbon Black Handbook compiled by the Carbon Black Association may be consulted for types of carbon black suitable for use in the present invention.

Organic powders are an example of the nonmagnetic powder comprised in the nonmagnetic layer of the magnetic recording medium of the present invention. Examples of organic powders employed in the present invention are acryl styrene resin powders, benzoguanamine resin powders, melamine resin powders, and phthalocyanine pigments. Polyolefin resin powders, polyester resin powders, polyamide resin powders, polyimide resin powders, and polyfluoroethylene resin are employed. Those compounds, the manufacturing methods of which are described in Japanese Unexamined Patent Publication (KOKAI) Showa Nos. 62-18564 and 60-255827, may be employed. These non-magnetic powders are employed in a range of 20 to 0.1 by weight and 10 to 0.1 by volume of the binder. More preferably, the volume ratio of the binder is from 2.0 to 0.3 times the volume of the powder comprised in the lower layer. In common magnetic recording tapes, an undercoating layer is generally provided to improve adhesion between the support and the magnetic layers or the like. This undercoating layer has a thickness equal to or less than 0.5 $\mu$m and is distinct from the nonmagnetic layer of the present invention. In the present invention, as well, an undercoating layer is desirably provided to enhance adhesion between the lower nonmagnetic layer and the support. The binders, lubricants, dispersing agents, additives, solvents, dispersion methods, and the like employed in the magnetic layer may be applied in the nonmagnetic layer. In particular, known techniques relating to the magnetic layer may be applied to the quantity and type of binder, additives, and quantity and type of dispersants added.

[The Support]

A known flexible film in the form of a polyester such as polyethylene terephthalate or polyethylene naphthalate, polyolefins, cellulose triacetate, polycarbonates, polyamides, polyimides, polyamidoimides, polysulfines, aramides, and aromatic polyamides may be employed as the nonmagnetic support of the magnetic recording medium of the present invention. Preferred supports are made of polyethylene naphthalate, polyamide (aromatic polyamide, aramide), or polyimide.

The support may be in advance subjected to corona discharge treatment, plasma treatment, adhesion enhancing treatment, heat treatment, dust removal, or the like. The F-5 value in the tape running direction of the nonmagnetic support desirably ranges from 49 to 490 MPa (5 to 50 $kg/mm^2$) and the F-5 value in the tape width direction desirably ranges from 29.4 to 294 MPa (3 to 30 $kg/mm^2$). The F-5 value in the longitudinal direction of the tape is normally greater than the F-5 value in the width direction of the tape. However, this does not apply when there is a particular need to increase the strength in the width direction.

The thermal shrinkage rate after 30 min at 100° C. in the tape running direction and width direction of the support is desirably equal to or less than 3 percent, preferably equal to or less than 1.5 percent, and the thermal shrinkage rate after 30 min at 80° C. is desirably equal to or less than 1 percent, preferably equal to or less than 0.5 percent. The stress at break in both directions desirably ranges from 49 to 980 MPa (5 to 100 $kg/mm^2$) and the modulus of elasticity desirably ranges from 0.98 to 19.6 GPa (100 to 2,000 $kg/mm^2$).

The magnetic recording medium of the present invention has a three-layered structure consisting of a servo layer, a nonmagnetic layer, and an information recording layer and can be coated by the following method, for example.

From the perspective of the three-layered structure, the coating areas are divided into two spots and integrated coating is conducted by the following method. In the first coating area, the single layered magnetic layer for servo signal recording is applied to one surface of the support. Next, in the second coating area, before the servo layer has dried, the nonmagnetic layer coating liquid followed by the coating liquid for magnetic layer for information recording are made to flow through slit-opening coating heads into which two coating liquid-passing slits have been fashioned, after which magnetic field orientation is conducted and the coatings are dried. The first coating and second coating area are close together in a single step. By conducting the coating step all at once, economic losses are minimized. To keep the interface roughness at the interface of the magnetic layer for servo signal recording and the nonmagnetic layer within the range of 7 to 12 nm, preferably 8 to 11 nm, it is important that the viscosity of the coating liquids be kept to within certain prescribed values in this step. Further, the viscosity of the nonmagnetic layer coating liquid and the information recording layer coating liquid applied thereover desirably decrease in that order.

The process for manufacturing the magnetic coating liquid for the magnetic recording medium of the present invention comprises at least a kneading step, a dispersing step, and a mixing step to be carried out, if necessary, before or after the kneading and dispersing steps. Each of the individual steps may be divided into two or more stages. All of the starting materials employed in the present invention, including the ferromagnetic powder, binders, carbon black, abrasives, antistatic agents, lubricants, solvents, and the like, may be added at the beginning or during any of the steps. Moreover, the individual materials may be divided and added during two or more steps; for example, polyurethane may be divided and added in the kneading step, the dispersing step, and the mixing step for viscosity adjustment after dispersion.

As mentioned above, conventionally known-manufacturing techniques may of course be utilized for manufacturing the magnetic recording medium of the present invention. In the kneading step, a kneader having a strong kneading force such as a continuous kneader or a pressure kneader may be used. When a continuous kneader or pressure kneader is employed, the ferromagnetic powder and all or part of the binder (preferably equal to or higher than 30 percent of the entire quantity of binder) are kneaded in the range of, for example, 15 to 500 parts by weight per 100 parts by weight of ferromagnetic powder. Details of the kneading treatment are described in Japanese Unexamined Patent Publication (KOKAI) Heisei No. 1-106338 and Japanese Unexamined Patent Publication (KOKAI) Showa No. 64-79274. When preparing the nonmagnetic layer liquid, a dispersing medium having a high specific gravity is desirably utilized, with zirconia beads being suitable.

To prevent compromising the electromagnetic characteristics or the like of the magnetic recording tape by aggregation of magnetic powder, shear is desirably imparted to the coating liquid in the coating head by a method such as disclosed in Japanese Unexamined Patent Publication (KOKAI) Showa No. 62-95174 or Japanese Unexamined Patent Publication (KOKAI) Heisei No. 1-236968.

Heat-resistant plastic rollers such as epoxy, polyimide, polyamide, polyimideamide or the like can be used as calender processing rollers. Processing may also be conducted with metal rollers. The processing temperature is preferably equal to or higher than 70° C., more preferably equal to or higher than 80° C. Linear pressure is desirably equal to or higher than 200 kg/cm, more preferably equal to or higher than 300 kg/cm. In the magnetic recording tape of the present invention, for example, the friction coefficient for SUS420J can be equal to or less than 0.5, preferably equal to or less than 0.3 in the magnetic layer for information recording and magnetic layer for servo signal recording. The specific surface resistivity of the magnetic layer for information recording and magnetic layer for servo signal recording can range from $10^4$ to $10^{12}$ Ω/sq, for example. The modulus of elasticity at 0.5 percent extension of the magnetic layer in both the running direction and the width direction ranges from 0.98 to 19.6 GPa (100 to 2000 kg/mm$^2$), the breaking strength preferably ranges from 1 to 30 kg/cm$^2$, the modulus of elasticity of the magnetic recording tape preferably ranges from 0.98 to 14.7 GPa (100 to 1500 kg/mm$^2$) in both the running direction and the longitudinal direction, the residual elongation is preferably equal to or less than 0.5 percent, and the thermal shrinkage rate at all temperatures below 100° C. is preferably equal to or less than 1 percent, more preferably equal to or less than 0.5 percent, and most preferably equal to or less than 0.1 percent. The glass transition temperature of the magnetic layer (i.e., the temperature at which the loss elastic modulus of dynamic viscoelasticity peaks as measured at 110 Hz) of every magnetic layer is preferably equal to or higher than 50° C. and equal to or less than 120° C., and that of the nonmagnetic layer preferably ranges from 0 to 100° C. The loss elastic modulus preferably falls within the range of $1 \times 10^7$ to $8 \times 10^8$ Pa ($1 \times 10^8$ to $8 \times 10^9$ dyne/cm$^2$) and the loss tangent is preferably equal to or less than 0.2. When the loss tangent becomes relatively low, the advantage that adhesion failure seldom occurs can be obtained.

The residual solvent in the magnetic layer is preferably equal to or less than 100 mg/m$^2$ and more preferably equal to or less than 10 mg/m$^2$ in every magnetic layer. In both the nonmagnetic lower layer and the magnetic layer, the void ratio is preferably equal to or less than 30 volume percent, more preferably equal to or less than 20 volume percent. Although a low void ratio is preferable for attaining high output, there are some cases in which it is better to maintain a certain level. For example, in magnetic recording media for data recording where repeat applications are important, higher void ratios often result in better running durability. The switching field distribution (SFD) of the magnetic layer is preferably equal to or less than 0.6. The centerline surface roughness (cutoff value 0.25 mm) Ra of the magnetic layers is desirably 1 to 10 nm; however, this value is suitably set based on the objective. To improve electromagnetic characteristics, the smaller the Ra the better. However, to improve running durability, the bigger Ra is the better. The RMS (mean square) surface roughness $R_{RMS}$ as evaluated by atomic force microscope (AFM) desirably falls within a range of 2 to 15 nm. [The Layer Configuration]

The thickness of the support, magnetic layer for information recording, nonmagnetic layer, and magnetic layer for servo signal recording in the magnetic recording medium of the present invention will be described below.

A thin magnetic layer for information recording is effective because only the surface of the recording layer contributes to short wavelength recording. The thickness thereof generally falls within a range of 0.05 to 2.0 μm, preferably 0.1 to 1.8 μm.

Although the thickness of the magnetic layer for servo signal recording is not specifically limited, since recording is conducted at long wavelengths and deep layer recording is possible, the thickness desirably falls within a range of 0.5 to 3.0 μm, more preferably, 0.5 to 2.5 μm.

In the present invention, employing a thick nonmagnetic layer reduces the effect of data signals written into the magnetic layer for information recording on servo information recorded in the magnetic layer for servo signal recording, increasing the stability of the servo signal. When the nonmagnetic layer is excessively thick, the precision with which the servo signal is read decreases. Thus, the thickness of the nonmagnetic layer falls within the range of 0.1 to 3.0 μm, preferably 0.5 to 2.5 μm. Further, to enhance the surface properties of the magnetic layer for information recording, a smooth nonmagnetic layer is desirably employed.

The thickness of the nonmagnetic support falls within the range of 1 to 100 μm, preferably 4 to 80 μm.

The combined thickness of the magnetic layer for information recording, nonmagnetic layer, and magnetic layer for servo signal recording falls, for example, within a range of 1/100$^{th}$ to twice the thickness of the nonmagnetic support. An undercoating layer may be provided between the nonmagnetic support and the magnetic layer for servo signal recording to improve adhesion. The thickness of the undercoating layer is, for example, 0.01 to 2 μm, preferably 0.02 to 0.7 μm.

In the magnetic recording medium of the present invention, a conventionally employed backcoat layer comprising carbon black can be provided on the rear surface of the support from the surface on which are provided the multiple magnetic layers. However, the backcoat layer may also be omitted based on the objective being sought.

The overall thickness of the magnetic recording medium of the present invention falls within the range of 2 to 20 μm, preferably 5.0 to 13.5 μm, and more preferably, 7.0 to 12.5 μm. An overall thickness of the magnetic recording tape falling within the above-stated range is useful from the viewpoint of system design and is optimal for ensuring quality with regard to running characteristics.

When the magnetic recording medium of the present invention is a magnetic recording tape, for example, the width of the magnetic recording tape can fall within the range of 3 to 20 mm, preferably 7 to 19 mm, and more preferably, 10 to 13 mm in order to facilitate system design and functional usability on handling.

The magnetic recording medium of the present invention includes tapes in which a servo control signal for controlling the position of the recording and reproduction heads relative to the magnetic recording medium in the width direction is recorded along the longitudinal direction of the magnetic recording medium in the magnetic layer for servo signal recording.

The servo control signal may be recorded on the layer for servo signal recording present in the magnetic recording medium of the present invention in the following manner, for example.

The signal is recorded on the servo signal recording layer with a servo signal recording head and a signal control system. In this case, the servo signal recording head is desirably capable of maintaining a gap relative to the servo track that is being generated and recording multiple servo tracks at once.

To control the position of the recording and reproduction heads relative to the magnetic recording tape in the width direction, a servo control signal is recorded in the longitudinal direction of the magnetic recording tape, thereby preventing the reproduction head from shifting from the optimum position on the track in which the signal is recorded, and preventing the output from falling off. Thus, the recording of a servo signal in the longitudinal direction and the detection of the position of the head relative to the tape afford certain advantages and are relative necessities in achieving a high recording density.

The magnetic recording tape of the present invention is suitably employed in magnetic recording and reproduction systems employing magnetoresistive reproduction heads. The magnetic recording tape of the present invention is also suitably employed for computer data recording.

[Embodiments]

The present invention is described in greater detail below through embodiments. That the components, proportions, operations, sequences, and the like given herein may be varied without departing from the scope or spirit of the present invention will be readily understood by persons skilled in the trade. Accordingly, the present invention is not limited to the embodiments given below. The parts given in the embodiments are parts by weight.

| < Components for forming magnetic layer = information recording layer (upper layer) > | |
|---|---|
| Ferromagnetic metal powder | 100 parts |
| Composition Fe/Co = 88/12 (atomic ratio) | |
| Hc: 179 kA/m (2250 Oe) | |
| Specific surface area by BET method: 59 m$^2$/g | |
| Crystalline size: 178 Å | |
| Particle size (mean axis diameter): 0.092 μm | |
| Acicular ratio: 7 | |
| σs: 133 A · m$^2$/kg (133 emu/g) | |
| pH: 8.4 | |
| Water soluble Na: 70 ppm | |
| Water soluble Ca: 10 ppm | |
| Water soluble Fe: 10 ppm | |
| Vinyl chloride copolymer | 12 parts |
| (MR-110 manufactured by Nippon Zeon Co., Ltd.) | |
| —SO$_3$Na content: 5 × 10$^{-6}$ eq/g | |
| Degree of polymerization: 350 | |
| Epoxy group (3.5 weight percent as a monomer unit) | |
| Polyester polyurethane resin | 3 parts |
| Neopentylglycol/caprolactone polyol/MDI | |
| (4,4'-diphenylmethane diisocyanate) = 0.9/2.6/1 | |
| —SO$_3$Na group content: 1 × 10$^{-4}$ eq/g | |
| Polyisocianate | 3 parts |
| (Coronate L manufactured by Nippon Polyurethane Industry Co. Ltd.) | |
| α-alumina (particle size: 0.2 μm) | 5 parts |
| Carbon black (particle size: 0.10 μm) | 0.5 parts |
| Butyl stearate | 1 part |
| Stearic acid | 2 parts |
| Methyl ethyl ketone | 150 parts |
| Cyclohexanone | 75 parts |
| < Components for forming magnetic layer = magnetic layer for servo signal recording (lower layer) > | |
| Ferromagnetic metal powder | 100 parts |
| Composition Fe/Co = 92/8 (atomic ratio) | |
| Specific surface area by BET method: 56 m$^2$/g | |
| Crystalline size: 172 Å | |
| Crystalline size (major axis diameter): 0.09 μm | |
| Acicular ratio: 7 | |
| σs: 130 A · m$^2$/kg (130 emu/g) | |
| pH: 8.6 | |
| Water soluble Na: 70 ppm | |
| Water soluble Ca: 10 ppm | |
| Water soluble Fe: 10 ppm | |
| Vinyl chloride copolymer | 12 parts |
| (MR-110 manufactured by Nippon Zeon Co., Ltd.) | |
| —SO$_3$Na content: 5 × 10$^{-6}$ eq/g | |
| Degree of polymerization: 350 | |
| Epoxy group (3.5 weight percent as a monomer unit) | |
| Polyester polyurethane resin | 3 parts |
| Neopentylglycol/caprolactone polyol/MDI | |
| (4,4'-diphenylmethane diisocyanate) = 0.9/2.6/1 | |
| —SO$_3$Na group content: 1 × 10$^{-4}$ eq/g | |
| Polyisocianate | 3 parts |
| (Coronate L manufactured by Nippon Polyurethane Industry Co. Ltd.) | |
| α-alumina (particle size: 0.2 μm) | 5 parts |
| Carbon black (particle size: 0.10 μm) | 0.5 parts |
| Butyl stearate | 1 part |
| Stearic acid | 2 parts |
| Methyl ethyl ketone | 150 parts |
| Cyclohexanone | 50 parts |
| < Components for forming nonmagnetic layer > | |
| Nonmagnetic powder TiO$_2$ Crystal type rutile | 90 parts |
| Mean primary particle diameter: 0.035 μm | |
| Specific surface area by BET method: 40 m$^2$/g | |
| pH: 7 | |
| TiO$_2$ content: 90 percent or more | |
| DBP oil absorption capacity: 27 to 38 g/100 g | |
| Surface covering compound (Al$_2$O$_3$): 1.5 weight percent | |
| Mohs' hardness: 6.0 | |
| Carbon black (manufactured by Mitsubishi Carbon Co., Ltd.) | 10 parts |
| Mean primary particle diameter: 16 nm | |
| DBP oil absorption capacity: 80 ml/100 g | |
| pH: 8.0 | |
| Specific surface area by BET method: 250 m$^2$/g | |
| Volatile component: 1.5 percent | |
| Vinyl chloride resin | 12 parts |
| (MR-110 manufactured by Nippon Zeon Co., Ltd.) | |
| —SO$_3$Na and epoxy group are contained | |
| Polyester polyurethane | 5 parts |
| Neopentylglycol/caprolactone polyol/MDI | |
| (4,4'-diphenylmethane diisocyanate) = 0.9/2.6/1 | |
| —SO$_3$Na group content: 1 × 10$^{-4}$ eq/g | |
| Polyisocianate | 3 parts |
| (Coronate L manufactured by Nippon Polyurethane Industry Co. Ltd.) | |
| Butyl stearate | 1 part |
| Stearic acid | 2 parts |
| Methyl ethyl ketone | 150 parts |
| Cyclohexanone | 50 parts |
| < Components for forming backcoat layer > | |
| Carbon black | 100 parts |
| Mean primary particle diameter: 17 nm | |

-continued

DBP oil absorption capacity: 75 ml/100 g
pH: 8.0
Specific surface area by BET method: 220 m$^2$/g
Volatile component: 1.5 percent
Bulk density: 15 lbs/ft$^3$

| | |
|---|---|
| Nitrocellulose resin | 100 parts |
| Polyester polyurethane resin | 30 parts |
| (Nippollan manufactured by Nippon Polyurethane industry Co., Ltd.) | |
| Dispersant | |
| Copper oleate | 10 parts |
| Copper phthalocyanine | 10 parts |
| Barium sulfate (precipitated) | 5 parts |
| Methyl ethyl ketone | 500 parts |
| Toluene | 500 parts |
| Carbon black | 100 parts |

Mean primary particle diameter: 200 nm
DBP oil absorption capacity: 36 ml/100 g
pH: 8.5
Specific surface area by BET method: 200 m$^2$/g

| | |
|---|---|
| α-alumina (particle size: 0.2 μm) | 0.1 parts |

[Method of Manufacturing the Magnetic Recording Tape]

The various components of each of the above-described coating materials were charged to a continuous kneader, kneaded, and dispersed in a sandmill.

Three parts of polyisocyanate were added to each of the dispersions obtained for the nonmagnetic layer coating liquid, coating liquid for upper magnetic layer for information recording, coating liquid for lower magnetic layer for servo signal recording. To each of these were then added 45 parts of a mixed solvent of methyl ethyl ketone and cyclohexanone. Each of the coating liquids was then passed through a filter having a mean pore size of 1 μm to complete preparation of the coating liquids to form the nonmagnetic layer, magnetic layer for information recording, and magnetic layer for servo signal recording. Simultaneous integrated multilayer coating was conducted by applying on a polyethylene naphthalate (PEN) support 6 μm in thickness (centerline average surface roughness 0.05 μm (cutoff value 0.25 mm)) the coating liquid for magnetic layer for servo signal recording in an amount calculated to yield a dry thickness of 2.0 μm, immediately thereafter applying the nonmagnetic layer coating liquid in an amount calculated to yield a dry thickness of 1.5 μm, and immediately thereafter applying thereover the coating liquid for magnetic layer for information recording in an amount calculated to yield a dry thickness of 0.2 μm, and while each of the layers was still wet, conducting orientation with a cobalt magnet generating a magnetic force of 0.3 T (3,000 G).

The magnetic recording tape in which a magnetic layer for information recording, nonmagnetic layer, and magnetic layer for servo signal recording had been formed was calendered with a seven-stage calender comprised of only metal rolls (temperature 90° C., linear pressure 300 kg/cm, speed 200 m/min).

The roll of calendered magnetic recording tape was slit to a width of one-half inch. A 580 m length of the magnetic recording tape slitted to a width of one-half inch was then wound into a model 3480 cartridge. The winding rate was 7 m/sec. A servo signal was then recorded with a servo signal recording head at 4 m/s.

In magnetic recording tapes of Embodiments 1 to 6, the information recording layers were all comprised of identical magnetic layers, the type and Hc of the magnetic material incorporated into the magnetic layer for servo signal recording were varied, and magnetic recording tapes were manu factured. A backcoat layer comprising carbon black was provided on the rear surface of the support.

| | Hc of magnetic layer for information recording | Hc of magnetic layer for servo signal recording |
|---|---|---|
| Embodiment 1 | Alloy powder 147 kA/m (1850 Oe) | 179 kA/m (2250 Oe) |
| Embodiment 2 | Alloy powder 111 kA/m (1400 Oe) | 179 kA/m (2250 Oe) |
| Embodiment 3 | Co—γ—Fe$_2$O$_3$ 72.4 kA/m (9100 Oe) | 179 kA/m (2250 Oe) |
| Embodiment 4 | Chromium dioxide 39.8 kA/m (500 Oe) | 179 kA/m (2250 Oe) |
| Embodiment 5 | Hexagonal ferrite powder 71.6 kA/m (900 Oe) | 179 kA/m (2250 Oe) |
| Embodiment 6 | Alloy powder 168.8 kA/m (2120 Oe) | 179 kA/m (2250 Oe) |

In Embodiments 1 to 6, magnetic materials used in the magnetic layer for servo signal recording are as follows;

Embodiment 1
Ferromagnetic metal powder Fe/Co=92/8
Hc: 147 kA/m (1850 Oe)
Specific surface area by BET method: 56 m$^2$/g
Crystalline size: 172 A
σs: 130 A·m$^2$/kg (130 emu/g)
pH: 8.6
Particle size (major axis diameter): 0.09 μm
Acicular ratio: 7
Water soluble Na: 70 ppm
Water soluble Ca: 10 ppm
Water soluble Fe: 10 ppm Embodiment 2
Ferromagnetic metal powder Fe/Co=90/10 (atomic ratio)
Hc: 111 kA/m (1400 Oe)
Specific surface area by BET method: 52 m$^2$/g
Crystalline size: 173 Å
σs: 125 A·m$^2$/kg (125 emu/g)
pH: 9.0
Particle size (major axis diameter): 0.148 μm
Acicular ratio: 6.7
Water soluble Na: 80 ppm
Water soluble Ca: 15 ppm
Water soluble Fe: 10 ppm Embodiment 3
Co containing iron oxide
Hc: 72.4 kA/m (910 Oe)
Co content (Co/Fe): 5.9 at %
Specific surface area by BET method: 50 m$^2$/g
pH: 8.5
Moisture: 0.5 percent
Water soluble Na: 59 ppm
Water soluble Ca: 18 ppm Embodiment 4
Chromium dioxide
Hc: 39.8 kA/m (500 Oe)
Co content (Co/Fe): 3.3 at %
σs: 74 A·m$^2$/kg (74 emu/g)
Specific surface area by BET method: 30 m$^2$/g
Particle size (major axis diameter): 0.300 μm Moisture: 0.35 percent Embodiment 5

Hexagonal ferrite powder (Barium ferrite)

Hc: 71.6 kA/m (900 Oe)

σs: 62 A·m$^2$/kg (62 emu/g)

Specific surface area by BET method: 40 m$^2$/g

Particle size: 0.05 μm

Plate-shaped ratio (particle diameter/plate thickness): 3.5

Embodiment 6

Ferromagnetic metal powder (composition: 90/10 (atomic ratio))

Hc: 168.8 kA/m (2120 Oe)

Specific surface area by BET method: 57.5 m$^2$/g

Crystalline size: 178 Å

Particle size (major axis diameter): 0.090 μm

Acicular ratio: 7

σs: 132A·m$^2$/kg(132 emu/g)

pH: 8.4

Water soluble Na: 72 ppm

Water soluble Ca: 10 ppm

Water soluble Fe: 9 ppm

COMPARATIVE EXAMPLE 1

Comparative Example 1 was obtained by the same manner as Embodiment 1 with the sole difference being a position detection configuration in which the servo control signal was recorded on the same surface as the information recording layer.

COMPARATIVE EXAMPLE 2

Comparative Example 2 was obtained by the same manner as Embodiment 1 with the sole difference being that the magnetic layer for servo signal recording was provided on the rear surface of the support.

COMPARATIVE EXAMPLE 3

A magnetic recording tape in which there was no difference in the Hc of the information recording layer and that of the servo signal recording layer was manufactured in the same manner as Embodiment 1 with the same layer configuration as in the embodiments.

The same methods for manufacturing the information recording layer and the backcoat layer as in the embodiments were employed in manufacturing the magnetic recording tapes of Comparative Examples 1 to 3. Even after obtaining rolls of magnetic recording tape, the tapes were slit to a width of one-half inch in the same manner as in the embodiments, and following slitting, the tapes were wound in lengths of 580 m into model 3480 cartridges at a rate of 7 m/sec.

[Evaluation as Magnetic Recording Tapes]

The performance evaluations described below were conducted for the magnetic recording tapes that were obtained.

1. Assembly of Magnetic Recording and Reproduction System (1) Thin-Film Magnetic Head (1) Recording Head Structure: Inductive head in which two-turn, thin-film coil was gripped by Co-based amorphous magnetic thin-film yoke.

Track width: 66 μm

Gap length: 1.4 μm (2) Reproduction Head

Structure: Double-shield shunt bias MR (magnetoresistive) head.

MR element was Fe/Ni (permalloy) alloy thin film.

Track width: 22 μm

Shield gap: 0.45 μm (2) Assembly of Magnetic Reproduction System

The magnetic reproduction head was mounted in an F613A drive (model 3480 one-half inch cartridge magnetic tape recording and reproduction unit) made by Fujitsu (K.K.), and a magnetic recording and reproduction system with a tape speed of 40 inches/sec was produced.

2. Measurement Evaluation of Reproduction Head

The magnetic recording tapes of the embodiments and comparative examples were loaded into the above-described magnetic recording and reproduction system and the reproduction output was evaluated under the following conditions.

A. Without Servo Control

An information signal was recorded at a recording wavelength of 0.8 μm with 128 tracks measuring 80 μm in track width and reproduced with a reproduction head having a width of 50 μm and the output was measured and evaluated.

B. With Servo Control

A special linear tape open (LTO) servo write head with a tape feed rate of 4 m/sec was manufactured and LTO servo formatting was conducted in advance. The stripe width was made 2.5 μm. This corresponded to an actual wavelength of 5.0 μm.

Next, an information signal was recorded at a recording wavelength of 0.5 μm with 128 tracks measuring 80 μm, and the output of a reproduction head 50 μm in width subjected to track controls by a servo was measured and evaluated.

3. Interface Roughness at Interface of Servo Layer and Nonmagnetic Layer

The centerline average roughness of an area measuring 250 to 250 μm on the surface of the magnetic layer for servo signal recording was measured by the MIRAU method with a TOPO3D from WYKO. Although the magnetic recording tape of the present invention had a three-layered structure, there was a portion of the servo layer surface on which neither the nonmagnetic layer nor the information recording layer were coated. Accordingly, the surface roughness of that portion was measured and the result adopted as the interface roughness at the interface of the servo layer and nonmagnetic layer.

4. Durability Test

The magnetic recording tapes (without track control by servo signal) of the embodiments and the comparative examples were loaded into the above-described magnetic recording and reproduction system and repeat running thereof in the form of 50,000 passes of the entire length of the tape was evaluated. In that process, reproduction output was measured over the entire length of the magnetic recording tapes and the amount of drop relative to the initial reproduction output was evaluated as the output dropoff.

5. Frequency of Occurrence of Servo Errors

A 5,000 pass repetition durability test was conducted while controlling the servo signal and the servo error occurrence frequency was measured. In particular, when portions that could not be written were encountered during running, the condition upon retry was observed and evaluated.

6. S/N Ratio of Magnetic Layer for Information Recording

In the above-described magnetic recording and reproduction system, the magnetic recording tapes of the embodiments and comparative examples were loaded into the drive and the output and noise difference during drive measurement were denoted in decibels (dB). A level of 20 dB or more presents no problem in actual use.

7. Number of Errors Generated

The number of errors generated divided by the 20 dB slice level when recording and reproduction at 200 GB in the magnetic recording and reproduction system is given. Twenty or fewer errors presents no problem in actual use.

8. Capacity Comparison

When both the servo signal and the information signal are recorded on a single layer (Comparison Example 1), the amount of information signal that can be recorded is reduced by the amount of servo signal recorded. Accordingly, the capacity comparison value is the relative value of the information signal capacity from which the servo signal contribution has been subtracted, to the information signal capacity when there is no servo signal contribution. Accordingly, since there was no servo signal contribution to the information signal capacity in Embodiments 1 to 6 and Comparative Examples 2 and 3, the capacity comparison thereof was 1.0.

The magnetic recording tape of Comparative Example 2, in which magnetic layer for servo signal recording was provided on the rear surface of the support, exhibited a higher number of errors generated and poorer running stability than the magnetic recording tapes of the embodiments.

Despite having a layer configuration identical to that of the magnetic recording tapes of the embodiments, Comparative Example 3, which had no difference in Hc in the information recording layer and servo signal recording layer, exhibited a poorer S/N ratio, higher number of errors generated, and poorer running stability than the embodiments. Further, since there was no difference in the Hc levels of the two magnetic layers, there was an interference effect between the magnetic layers and the linear recording density in the information recording layer tended not to rise.

The magnetic recording medium of the present invention provides a magnetic recording medium suited to magnetic recording and reproduction systems employing linear methods and incorporating magnetoresistive reproduction heads.

TABLE 1

|  | Control of servo control signal | Layer configuration and Hc of servo layer (kA/m) [B] | Interface roughness (nm) | Number of servo track | S/N of information layer |
| --- | --- | --- | --- | --- | --- |
| Embodiment 1 | Done | Multilayered magnetic layer 127 (1600 Oe) | 8.6 | 5 | 26 |
| Embodiment 2 | Done | Multilayered magnetic layer 95.5 (1200 Oe) | 8.2 | 5 | 27 |
| Embodiment 3 | Done | Multilayered magnetic layer 72.4 (910 Oe) | 9.4 | 5 | 28 |
| Embodiment 4 | Done | Multilayered magnetic layer 39.8 (500 Oe) | 10.2 | 5 | 28.5 |
| Embodiment 5 | Done | Multilayered magnetic layer 71.6 (900 Oe) | 8.8 | 5 | 28 |
| Embodiment 6 | Done | Multilayered magnetic layer 168.8 (2120 Oe) | 8.5 | 5 | 25 |
| Comp. Ex. 1 | Done | Single layer, information recording layer in the same surface 179 (2250 Oe) | 3.8 | 5 | 11 |
| Comp. Ex. 2 | Done | Rear surface of support 71.6 (900 Oe) | 9.6 | 5 | 25 |
| Comp. Ex. 3 | Done | Multilayered magnetic layer 179 (2250 Oe) | 8.8 | 5 | 21 |

|  | Hc of information layer (kA/m) [A] | Difference [A–B] (kA/m) | Running durability 50000 times (times) | Number of occurring errors (times) | Capacity comparison |
| --- | --- | --- | --- | --- | --- |
| Embodiment 1 | 179 (2250 Oe) | 51.7 (650 Oe) | Complete running | 3 | 1.0 |
| Embodiment 2 | 179 (2250 Oe) | 83.6 (1050 Oe) | Complete running | 2 | 1.0 |
| Embodiment 3 | 179 (2250 Oe) | 106.7 (1340 Oe) | Complete running | 0 | 1.0 |
| Embodiment 4 | 179 (2250 Oe) | 139.3 (1750 Oe) | Complete running | 0 | 1.0 |
| Embodiment 5 | 179 (2250 Oe) | 107.5 (1350 Oe) | Complete running | 1 | 1.0 |
| Embodiment 6 | 179 (2250 Oe) | 10.3 (130 Oe) | Complete running | 58 | 1.0 |
| Comp. Ex. 1 | 179 (2250 Oe) | 0 | 32000 | 35000 | 0.9 |
| Comp. Ex. 2 | 179 (2250 Oe) | 107.5 (1350 Oe) | Complete running | 1350 | 1.0 |
| Comp. Ex. 3 | 179 (2250 Oe) | 0 | Complete running | 4850 | 1.0 |

[Evaluation Results]

Table 1 presents evaluation results for Embodiments 1 to 6 and Comparative Example 1 to 3. As shown in Table 1, the magnetic recording tapes of Embodiments 1 to 6 having dedicated multilayered magnetic layers exhibited a good S/N ratio in the information recording layer and good running durability. Further, the servo error of the magnetic recording tapes of Embodiments 1 to 6 was at a level presenting no practical problems.

The magnetic recording tape of Comparative Example 1, in which the information signal and the servo signal were recorded on the same surface, exhibited both an S/N ratio and running durability that were poorer than those of the magnetic recording tapes of the embodiments.

That is, due to a higher recording density and high recording capacity, in magnetic recording media having a multilayered magnetic layer comprising a nonmagnetic support, a lower magnetic layer, a nonmagnetic layer, and an upper magnetic layer in that order, by making the upper magnetic layer a dedicated servo signal recording layer, making the lower magnetic layer a dedicated information recording layer, making the Hc of the magnetic layer for servo signal recording at least 7.96 kA/m (100 Oe) higher than the Hc of the magnetic layer for information recording, and controlling the interface roughness at the interface of the magnetic layer for servo signal recording and the nonmagnetic layer, results presenting no particular practical problems as well as highly reliable servo control were achieved.

Accordingly, the magnetic recording tape of the present invention is suited to recording and reproduction at the narrow track widths that will be required by the higher densities of the future, and permits recording and reproduction with high reliability and stability without the occurrence of track displacement (off track) during running and without the occurrence of servo errors.

The present disclosure relates to the subject matter contained in Japanese Patent Application No. 2001-88610 filed on Mar. 26, 2001, which is expressly incorporated herein by reference in its entirety.

What is claimed is:

1. A magnetic recording medium comprising a magnetic layer for servo signal recording, a nonmagnetic layer, and a magnetic layer for information recording in this order on a nonmagnetic support, wherein said magnetic layer for information recording exhibits a coercivity of at least 7.96 kA/m (100 Oe) higher than a coercivity of said magnetic layer for servo signal recording and an interface roughness at the interface of said magnetic layer for servo signal recording and said nonmagnetic layer ranges from 7 to 12 nm.

2. The magnetic recording medium of claim 1 wherein said magnetic recording medium is a magnetic recording tape.

3. The magnetic recording medium of claim 2 wherein said magnetic recording tape has a width ranging from 3 to 20 mm.

4. The magnetic recording medium of claim 2 wherein said magnetic recording tape has a width ranging from 7 to 19 mm.

5. The magnetic recording medium of claim 2 wherein said magnetic recording tape has a width ranging from 10 to 13 mm.

6. The magnetic recording medium of claim 2 wherein said magnetic recording tape has an overall thickness ranging from 2 to 20 $\mu$m.

7. The magnetic recording medium of claim 2 wherein said magnetic recording tape has an overall thickness ranging from 5.0 to 13.5 $\mu$m.

8. The magnetic recording medium of claim 2 wherein said magnetic recording tape has an overall thickness ranging from 7.0 to 12.5 $\mu$m.

9. The magnetic recording medium of claim 2 wherein said nonmagnetic support is made of polyethylene naphthalate, polyamide (aromatic polyamide, aramide), or polyimide.

10. The magnetic recording medium of claim 2 wherein said magnetic recording tape has servo control signals recorded along the londitudinal direction of the magnetic recording tape.

11. The magnetic recording medium of claim 10 wherein said servo control signals control position of a recording and reproduction head relative to said magnetic recording tape in the widthwise direction.

12. A method for employing the magnetic recording tape of claim 2 wherein said magnetic recording tape is employed in a magnetic recording and reproduction system equipped with a magnetoresistive reproduction head.

13. The method of claim 12 wherein said magnetic recording tape is employed in computer data recording.

14. The magnetic recording medium of claim 1 wherein said magnetic layer for information recording has a thickness of 0.05 to 2.0 $\mu$m, said nonmagnetic layer has a thickness of 0.1 to 3.0 $\mu$m and said magnetic layer for servo signal recording has a thickness of 0.5 to 3.0 $\mu$m.

15. The magnetic recording medium of claim 1 wherein said magnetic layer for information recording comprises a magnetic material selected from ferromagnetic metal powders and alloy powders; and said magnetic layer for servo information recording comprises a magnetic material selected from ferromagnetic metal powders and alloy powders.

16. The magnetic recording medium of claim 1 wherein said nonmagnetic support is made of polyethylene naphthalate, polyamide (aromatic polyamide, aramide), or polyimide.

* * * * *